(12) United States Patent
Haber et al.

(10) Patent No.: US 9,854,125 B2
(45) Date of Patent: Dec. 26, 2017

(54) COMPUTING NEW CERTIFICATE FOR DIGITIZED VERSION OF A PHYSICAL DOCUMENT

(75) Inventors: Stuart Haber, New York, NY (US); Prasad V. Rao, Metuchen, NJ (US)

(73) Assignee: Ent. Services Development Corporation LP, Houston, TX (US)

( * ) Notice: Subject to any disclaimer, the term of this patent is extended or adjusted under 35 U.S.C. 154(b) by 538 days.

(21) Appl. No.: 13/361,064

(22) Filed: Jan. 30, 2012

(65) Prior Publication Data

US 2013/0194636 A1    Aug. 1, 2013

(51) Int. Cl.
     *H04N 1/32*      (2006.01)
     *H04L 9/32*      (2006.01)

(52) U.S. Cl.
     CPC ....... *H04N 1/32101* (2013.01); *H04L 9/3263* (2013.01); *H04N 1/32133* (2013.01); *H04N 2201/3226* (2013.01); *H04N 2201/3235* (2013.01); *H04N 2201/3236* (2013.01)

(58) Field of Classification Search
     CPC .......... G06F 21/34; G06F 17/24; G06F 17/30
     USPC ........................................ 358/3.28; 382/100
     See application file for complete search history.

(56) References Cited

U.S. PATENT DOCUMENTS

| | | | |
|---|---|---|---|
| 6,658,403 B1 | 12/2003 | Kuroda et al. | |
| 2001/0039545 A1 | 11/2001 | Nishizawa | |
| 2004/0139327 A1 | 7/2004 | Brown et al. | |
| 2006/0265590 A1 | 11/2006 | DeYoung et al. | |
| 2006/0271787 A1 | 11/2006 | DeYoung et al. | |
| 2008/0030800 A1* | 2/2008 | Matsukawa et al. | 358/474 |
| 2008/0080017 A1* | 4/2008 | Ishizuka et al. | 358/452 |
| 2008/0184033 A1 | 7/2008 | Daniels et al. | |
| 2009/0030949 A1* | 1/2009 | Saito | 707/200 |
| 2009/0287931 A1 | 11/2009 | Kinsella | |
| 2011/0145569 A1* | 6/2011 | Liu et al. | 713/158 |
| 2012/0019868 A1* | 1/2012 | Sakurai | 358/1.16 |
| 2012/0086971 A1* | 4/2012 | Bisbee et al. | 358/1.14 |

FOREIGN PATENT DOCUMENTS

WO      2010143001 A1      12/2010

OTHER PUBLICATIONS

Burns et al., "Verifiable Audit Trails for a Versioning File System," Storage SS'05, Nov. 11, 2005, pp. 44-50.
Haber et al., "A Content Integrity Service for Digital Repositories," 3rd International Conference on Open Repositories, Apr. 2008, 7 p.
Haber et al., "A Content Integrity Service for Long-Term Digital Archives," Mar. 20, 2006, 7 p.

\* cited by examiner

*Primary Examiner* — Vincent Rudolph
(74) *Attorney, Agent, or Firm* — Sheppard Mullin Richter & Hampton LLP

(57) ABSTRACT

In one implementation, a physical version of a document is converted to a digital representation of the physical version and a new certificate is computed for the digital representation of the physical version. The new certificate is computed based on the digital representation of the physical version, at least one processing step performed on the digital representation, and a prior certificate computed for a prior digital representation indicative of the physical version. In another implementation, a document is validated.

20 Claims, 6 Drawing Sheets

COMPUTING NEW CERTIFICATE FOR DIGITIZED VERSION OF A PHYSICAL DOCUMENT

BACKGROUND

Information in a digital archive can include multi-part documents. In a long-term archive, these documents may be expected to undergo multiple transformations during their life-time. Examples of such transformations include format changes (e.g., transforming an editable text file to an image file such as a PDF file), modifications to sub-parts and to accompanying metadata. Further, part of the life cycle of a document may include the document in physical form (e.g., a printed version of the document). Skeptical users of a digital archive may desire, or be required, to verify the integrity of such documents.

BRIEF DESCRIPTION OF THE DRAWINGS

For a detailed description of exemplary examples, reference will now be made to the accompanying drawings in which.

DETAILED DESCRIPTION

Figure 1:
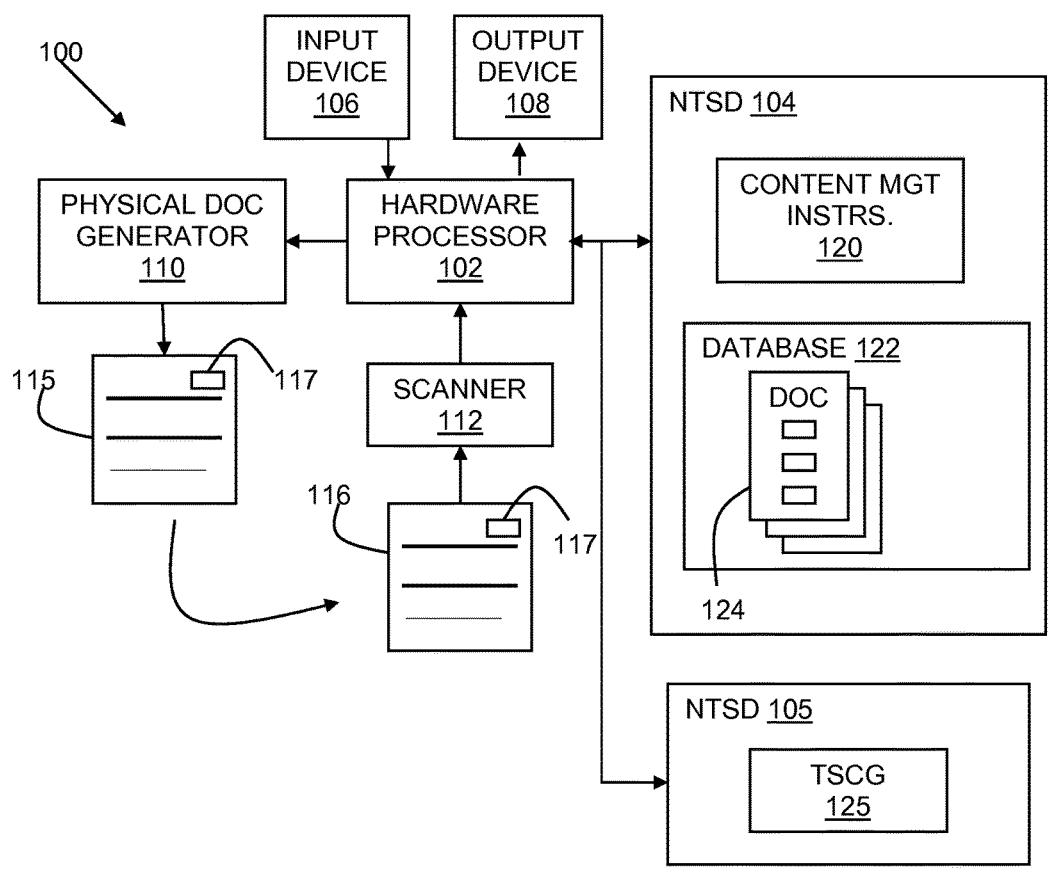
FIG. 1 shows a system in accordance with various examples.

FIG. 1 illustrates an example of a system 100 that includes one or more hardware processors 102 coupled to a non-transitory storage device (NTSD) 104 and a separate NTSD 105, although in some embodiments, a single NTSD can be used instead of multiple NTSDs. Each non-transitory storage device 104, 105 may comprise random access memory (RAM), a hard disk drive, a compact disc read only memory (CD ROM), or any other type of physical storage devices. The non-transitory storage device 104 stores content management instructions 120 which comprise machine readable instructions that are executable by hardware processor 102. Upon being executed by the hardware processor 102, the machine readable instructions cause the processor to perform some or all of the functionality described herein. The non-transitory storage device 104 also includes a database in which documents 124 can be stored.

System 100 also includes an input device 106 and a display 108 coupled to the hardware processor 102. The input device 106 may be implemented as a keyboard, mouse, trackball or other type of input device for controlling system 100. A scanner 112 and a physical document generator 110 are also coupled to the hardware processor 102. The scanner 112 may be, for example, a stand-alone scanner or the scanning device of a facsimile machine. The physical document generator 110 can create a physical document 115 by, for example, printing, faxing (e.g., printing an in-coming fax), or other process. The scanner 112 can receive a physical document and convert the physical document to digital form through a scanning process. In some examples, the physical document generator 110 may print a physical document 115 which is then scanned back into the system 100 via the scanner 112. A human may or may not have entered hand-made annotations on the printed physical document 115 before it is scanned back in to the system.

During the lifecycle of a document, multiple versions of the document may be created. For example, in the electronic realm, an existing word processing document may be converted to any one or more of a Portable Document Format (PDF) file, to a HyperText Markup Language (HTML) file, or to any of a variety of other formats. Further, a user may modify an existing word processing document to create an updated version of the word processing document. Document versions may refer to various different instances of the document. For example, if a document exists in three different file formats—for instance, a PDF file, a word processing file, and an HTML file—all such formats may be referred to as different versions of one overall document. Thus, the term document may refer to the collection of related versions. The versions may be related in that each version is derived from another version. The derivation of a given version may be referred to as a "transformation." For example, a word processing version may be transformed into a PDF version.

Word processing files, PDF files, and HTML files are various examples of digital versions. The physical document 115 created by the physical document generator 110 is also referred to as a version. The lifecycle of a document may include one or more digital versions and one or more physical versions.

The content management instructions 120 create an audit trail that may be verifiable and unforgeable throughout the lifecycle of a document. The content management system creates an audit trail that accommodates physical as well as digital versions. For example, part of the lifecycle of a document may include various physical versions which are subsequently scanned back into the system 100 and checked back in to the content management system. The audit trail for the document will permit the subsequently scanned in versions to be verified as well as their digital counterparts (word processing files, PDFs, etc.). The audit trail is explained below.

Figure 2:
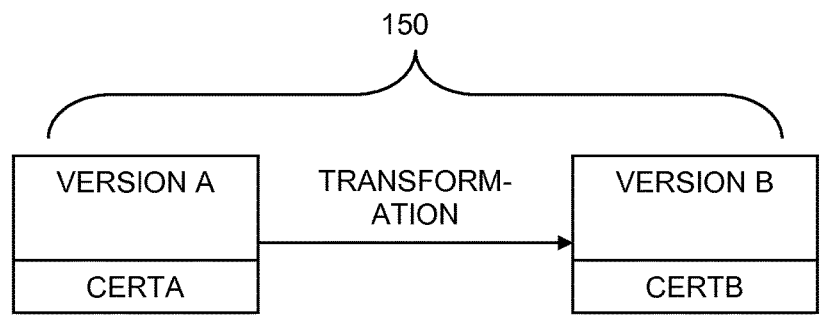
FIG. 2 illustrates several versions and corresponding certificates in accordance with various examples.

FIG. 2 illustrates an example of a document 150 having two digital versions—version A and version B. Version A undergoes a transformation (e.g., conversion of a word processing file to a PDF file) to generate digital version B. A time stamp certificate (CERT A) has previously been computed for version A. The computation of CERT A is much like the computation of the time stamp certificate for version B (CERT B), which will now be explained.

In FIG. 1, the NTSD 105 stores a time stamp certificate generator (TSCG) 125 which may comprise instructions executable by processor 102. In some implementations, the content management instructions 120 may implement the time stamp certificate generator instead of having a separate application to perform time stamp certificate generation. In yet other implementations, a third party time stamp certificate generator may be used which includes hardware and software separate from that shown in FIG. 1. Any of a variety of time stamp certificate generators can be implemented. One suitable example of a time stamp certificate generator is the hash-linking process in which hash values are computed and combined with other hash values. The way the hash values are linked together may make it computationally infeasible to back date a version. This process relies on the collision-resistance properties of hash functions.

To compute the certificate CERT B for version B, multiple inputs are provided to the time stamp certificate generator 125. Such inputs include one or more of the following inputs:

The bit string representation of version A
The bit string representation of version B
A description of the invocation of the transformation operation that was used to transform version A into version B
The time stamp certificate for version A (CERT A)
The time at which the transformation was made from version A to version B (e.g., date, time of day, both date and time of day, etc.)

In some implementations the time stamp certificate generator receives any or all of the above inputs and computes a hash value based on all such inputs. Any suitable hash function can be used in this regard. The inputs may be concatenated together and then a hash value may be computed based on the concatenated input values. As can be seen, the time stamp certificate CERT B for version B is based, in part, on information indicative of the history of the document. In the example above, CERT B is based, in part, on version A from which version B was derived, as well as version A's time stamp certificate. The time stamp certificates may be stored with the corresponding versions, or stored separately but linked to the corresponding versions in database 122.

Each time one digital version is transformed to another digital version, the content management system computes a new time stamp certificate for the newly generated digital version. Each time stamp certificate is computed based on at least one prior time stamp certificate and a corresponding version. As such, the time stamp certificates are mathematically linked together thereby providing the audit trail throughout the lifecycle of the document.

Physical versions (printed versions, faxed versions, etc.) are handled by the content management system in a different way than that described above for digital documents. To accommodate physical documents, the content management system performs a "check-out" process in which a physical document is generated based on a digital version (e.g., a digital version is printed) and a "check-in" process in which a physical version is brought into the content management system (e.g., scanned in by scanner 112).

The check-out process will now be described. Consider a version, for example, version B from the example above, at the ith stage of the document's lifecycle. The jth time version B is checked out (e.g., printed), the content management system causes a "version identifier" to be added to the version when it is checked out. In some implementations, the version identifier is represented as (N, i, j), where N refers to the name of the document in question.

The version identifier may be added to the document at a predetermined location on the physical document such as a specified position on each page of the version or on a cover page for the physical document. The version identifier may be added to the physical document in a readily readable optical representation or as another machine-readable optical representation that encodes the version identifier but from which the version identifier cannot be immediately discerned by the human eye (e.g., a bar code). FIG. 1 shows a representation of a version identifier 117 located on physical document 115.

Figure 3:
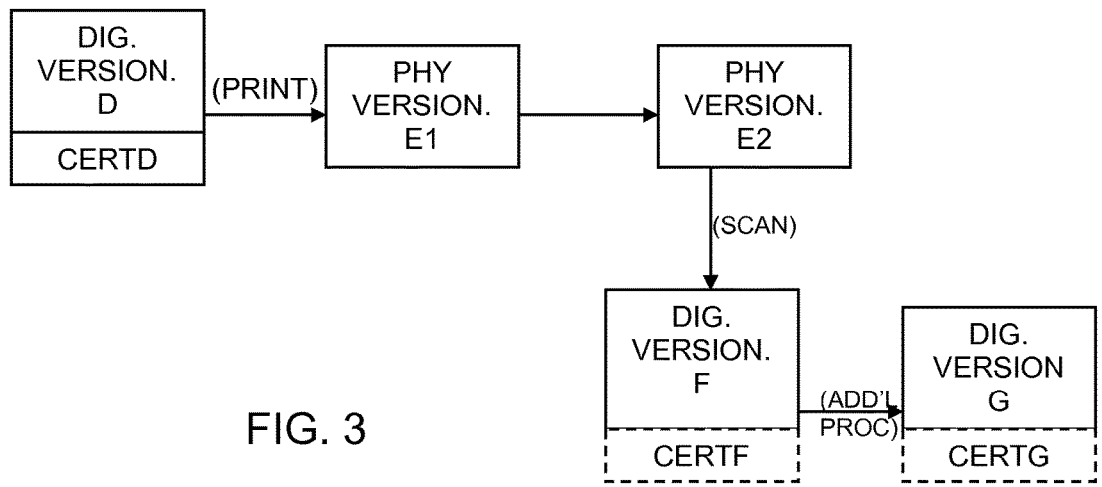
FIG. 3 provides another example of various versions and corresponding certificates.

FIG. 3 shows a document having constituent versions D, E1, E2, F and G. Digital version D has an associated time stamp certificate D. Version D is printed as physical version E1. The physical version E1 may be printed with a version identifier as explained above. A person may or may not modify the physical version E1 by hand. For example, a person may write on, or otherwise annotate, the physical version E1. Version E2 represents the version in which a person has entered an annotation by hand. In some examples, the physical version E1 and E2 may be a form that a person is to complete by, for example, providing answers to questions, checking certain applicable boxes, providing a physical signature, etc.

Physical version E2, with human-provided alterations, (or version E1 without human annotations) later may be scanned into the content management system as digital version F. That is, either or both of versions E1 and E2 can be scanned back in to the content management system. The content management system may provide a user interface during the scan operation in which the user is prompted to consent to the version being scanned in. The user consent may be in the form of, for example, a user interface that displays the document just scanned in and displays "OK" and "CANCEL" user-selectable software buttons based on whether the user consents to the document (OK) or determines that the document is incorrect (CANCEL). For example, the user may have inadvertently scanned in the wrong version. In some implementations, when the user provides his or her consent, a user credential is created or otherwise obtained from the user. Examples of user credentials include passwords, fingerprint scans, etc.

Once the user has consented, if user consent is required, the content management system identifies the version identifier on the scanned-in version. Identifying the version identifier includes analyzing the scanned-in digital image for an optical representation that matches what the content management system knows to equate to version identifiers. The version identifiers, as noted above, may be positioned at a certain location on the physical document and thus the content management system may limit, or at least focus, its search criteria for the known locations at which version identifiers may be found.

Once a version identifier is identified, the version identifier is analyzed to determine with which document the physical version was associated. Once the document is identified, the newly scanned-in digital version (version F in the present example) is associated with the correct document 124 in database 122. For example, each document may have a corresponding data structure that identifies that document by name and its constituent versions. Once the newly scanned-in version is matched to the correct document, an entry can be added to that document's data structure to associate the new digital version F with its document. Moreover, any time a new version is created within an overall document, an entry can be added to a data structure to associate the new version with its document.

One or more processing actions may be performed on version F to create version G. Examples of such additional processing actions may include any one or more of the following, or other processing actions:

Performing a "cleaning" process which may include such operations as cropping parts of images, edge detection, deskewing, text sharpening, and defect removal
Performing an optical character recognition (OCR) process Performing a comparison of the newly scanned-in versions (e.g., version F to a prior version within the same document.

A time stamp certificate can be generated for either or both of digital versions F and G. A time stamp certificate generated for version F is shown as CERTF, and the time stamp certificate generated for version G is shown as CERTG.

If a time stamp certificate is generated for version F (CERTF), that certificate is computed by computing a hash value based on multiple inputs including one or more of the following inputs:

The version identifier that was identified by the system on the scanned-in version The bit string representation of version D (the previous digital version of the document)

The bit string representation of version F (the newly scanned-in version)

A description of the invocation of the scanning operation that was used to scan in the physical version E1/E2 as digital version F The time stamp certificate for version D (CERT D)

A user credential obtained when the user provided consent during the scan operation as described above The time at which the scanning operation occurred (e.g., date, time of day, both date and time of day, etc.).

As explained above, the time stamp certificate generator may receive any or all of the above inputs and compute a hash value based on all such inputs. The inputs may be concatenated together and then a hash value may be computed based on the concatenated input values.

If a time stamp certificate is generated for version G (CERTG), that certificate is computed by computing a hash value based, in part, on the most recent digital version having a computed certificate. For example, if CERTF has been generated for version F, CERTG will be computed based on CERTF and version F. If, however, CERTF has not been generated, then CERTG will be computed based on CERTD and version D.

If CERTG is to be computed based on version F and its certificate, CERTF, CERTG will be computed based on multiple inputs including one or more of the following inputs The version identifier that was identified by the system on the scanned-in version The bit string representation of version F (the previous digital version of the version that was scanned in)

The bit string representation of version G (the version following one or more processing operations as explained above)

A description of the invocation of the scanning operation that was used to scan in the physical version E1/E2 as digital version F and/or any additional processing operations performed on digital version F The time stamp certificate for version F (CERT F)

A user credential obtained when the user provided consent during the scan operation as described above.

As explained above, the time stamp certificate generator may receive any or all of the above inputs and compute a hash value based on all such inputs. The inputs may be concatenated together and then a hash value may be computed based on the concatenated input values.

If CERTG is to be computed based on version D (e.g., no certificate was computed for version F) and its certificate, CERTD, CERTG will be computed based on multiple inputs including one or more of the following inputs The version identifier that was identified by the system on the scanned-in version The bit string representation of version D (the previous digital version of the version from which the physical version E was created (e.g., printed))

The bit string representation of version F

The bit string representation of version G

A description of the invocation of the scanning operation that was used to scan in the physical version E1/E2 as digital version F and, as desired, any additional processing operations performed on digital version F The time stamp certificate for version D (CERT D)

The time at which version G was created

A user credential obtained when the user provided consent during the scan operation as described above.

As explained above, the time stamp certificate generator may receive any or all of the above inputs and compute a hash value based on all such inputs. The inputs may be concatenated together and then a hash value may be computed based on the concatenated input values.

Figure 4:
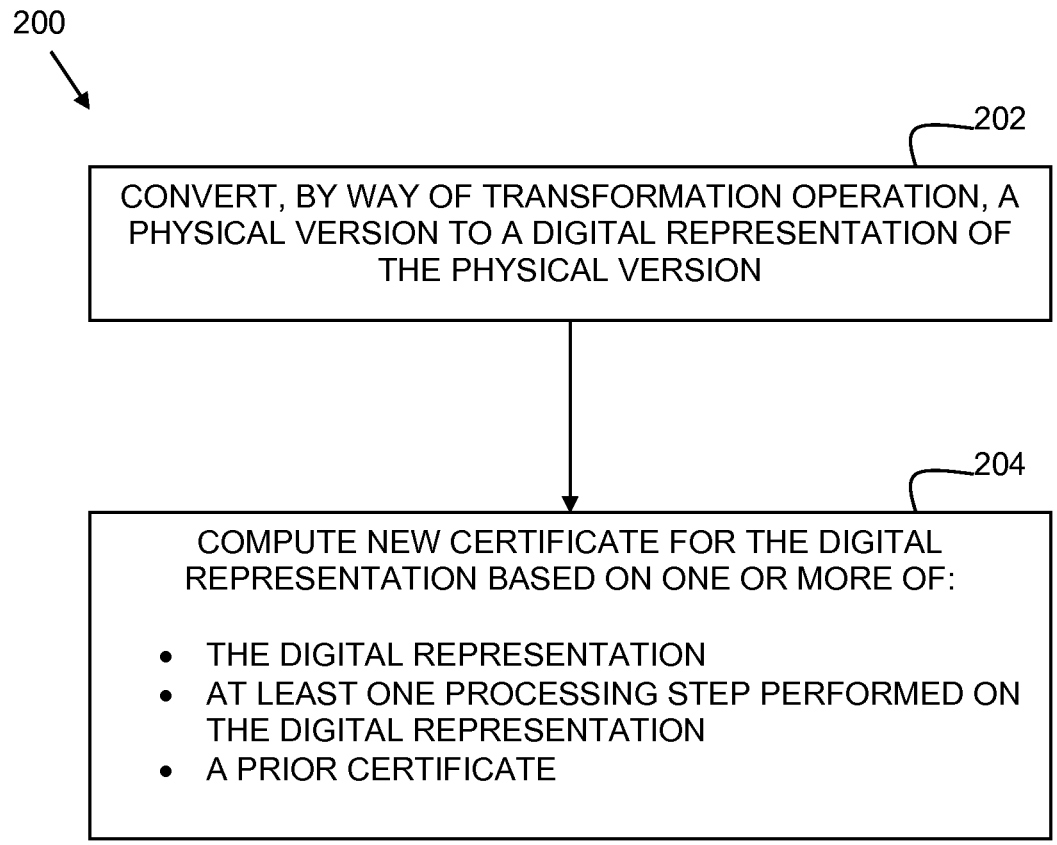
FIG. 4 shows a method in accordance with various examples.

FIG. 4 shows a method 200 in accordance with at least one embodiment. The method 200 may be implemented by system 100 shown in FIG. 1. In some implementations, method 200 is performed by hardware processor 102 executing the content management instructions 120.

At 202, the method includes converting, by way of a transformation operation, a physical version to a digital representation (version) of the physical version. The transformation operation may include, for example, a scanning operation performed using scanner 112.

At 204, the method includes computing a new certificate for the digital representation based on one or more of: the digital representation of the physical version, at least one processing step performed on the digital representation, a prior certificate computed for a prior digital representation indicative of the physical version. Other items may be considered as well when computing the certificate such as the prior digital representation (or a hash of the prior digital representation), an identifier of the transformation operation, and a version identifier. The prior digital representation may be a scanned in digital representation of the physical document or a digital representation from which the physical version was created.

Figure 5:
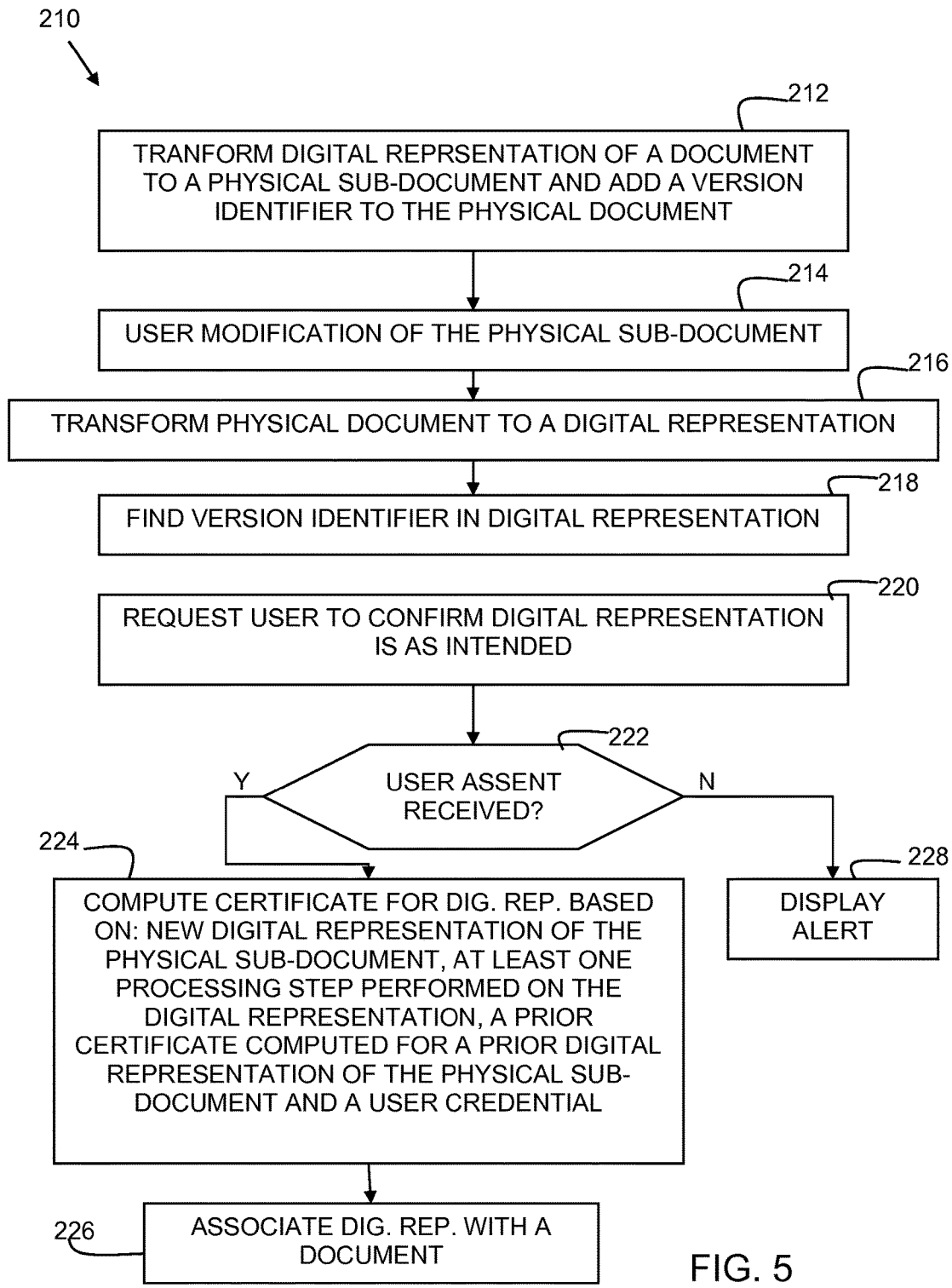
FIG. 5 shows another method in accordance with various examples.

FIG. 5 shows another method 210 in accordance with at least one embodiment. The method 210 may be implemented by system 100 shown in FIG. 1. In some implementations, method 210 is performed by hardware processor 102 executing the content management instructions 120.

At 212, the method includes transforming a digital representation of a document (e.g., a digital version) to a physical version and adding a version identifier to the physical version. The version identifier may be plain text or be another type of optical representation (e.g., bar code) that encodes or otherwise indicates the version identifier. At 214, a user performs a modification to the physical version (e.g., annotating the physical version). At 216, the method includes transforming the physical version to a digital representation (e.g., by scanning in the physical version via scanner 112).

At 218, the method comprises finding the version identifier on the newly scanned in digital representation and, at 220, requesting the user to confirm that that newly scanned in digital representation is what was intended by the user. If the user provides assent at 222 (by selecting "OK" in the example above), then the method comprises computing a time stamp certificate at 224 based on the new digital representation of the physical version, at least one processing step performed on the digital representation, and a prior certificate computed for a prior digital representation of the physical version. A user credential obtained when the user provides his or her assent may also be used to compute the time stamp certificate. The new digital representation of the physical version is then associated at 226 with a document using the version identifier identified at 218. If the user does not provide his or her assent, then the method comprises displaying an alert message at 228 providing feedback to the user that, for example, the newly scanned in version will not be imported in to the content management system and will not be associated with a document in the database.

Certificates can be generated for a portion of a version of a document (sometimes referred to as a sub-document). For example, if a multipage document is printed, each page may be considered to be a sub-document. A sub-document may be scanned in to the content management system by itself (i.e., without the remaining portion of that document version). Each such sub-document may be assigned its own name and that name can be used with the other values noted above to compute a time stamp certificate for that sub-document. The term "document" refers to an entire document or a portion of a document (sub-document).

As explained above, the time stamp certificates may provide a verifiable audit trail. A time stamp certificate for a given version of a document (e.g., a version that has just been checked in) can be validated to verify the authenticity of that version. Machine-readable instructions such as instructions 120 above, or different machine-readable instructions, can be used to perform the validation process. The process to validate a digital document that was created by digitizing a physical document can be performed as soon as the digital document is created or at any later point in time.

Figure 6:
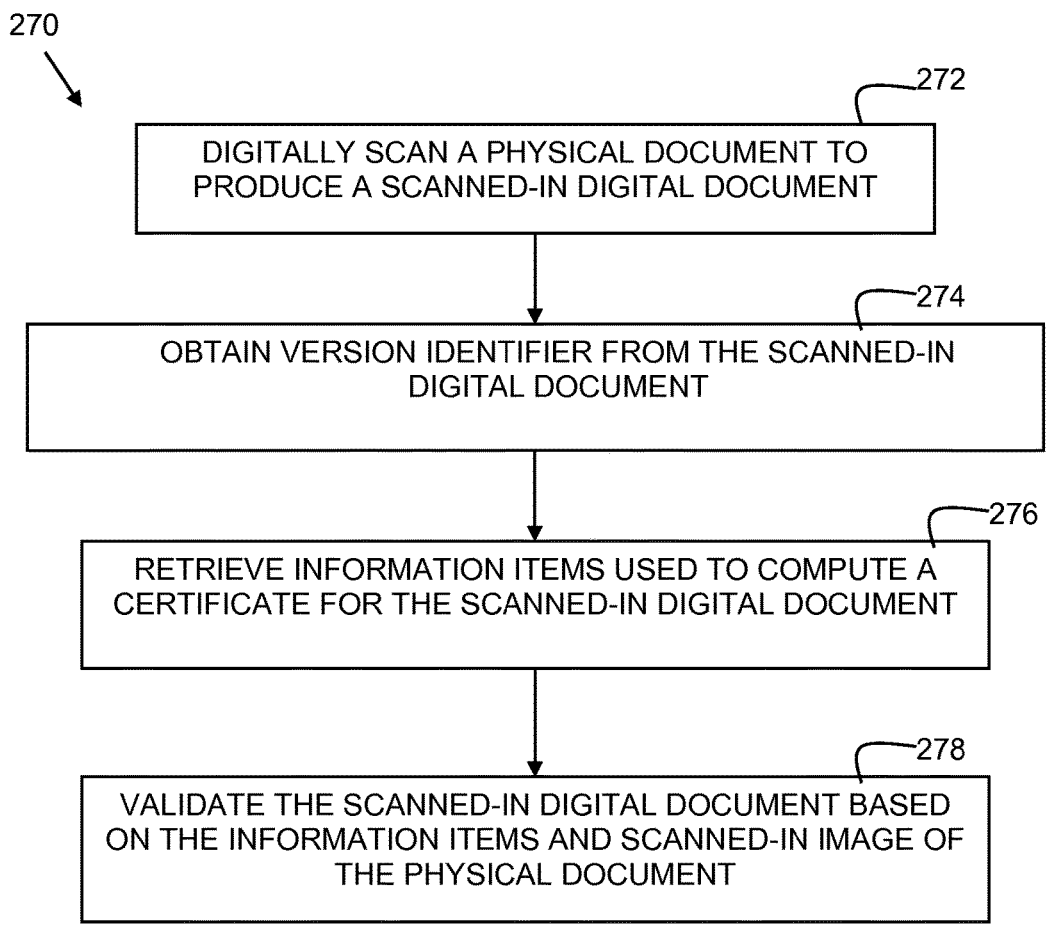
FIG. 6 illustrates a validation method in accordance with various examples.

FIG. 6 illustrates an example of a validation method 270. Method 270 includes at 272 digitally scanning a physical document to produce a scanned-in digital document. The physical document may have included a version identifier printed on the document as explained above. As part of the digitizing process (e.g., scanning), a time stamp certificate may be created for the newly scanned-in digital document as explained previously. It is this time stamp certificate that is being validated.

At 274, the validation method includes obtaining the version identifier from the digitized version of the physical document (e.g., OCR or other process as noted previously). The version identifier identifies which document has been digitized. At 276, information items used to compute the time stamp certificate for the scanned-in digital document (the certificate being validated) are retrieved using the version identifier. The information items are the various items that were used to compute the certificate for the scanned-in digital document. The information items include such items as the scanned-in image of the physical document, the time stamp certificate for the previous digital version (e.g., the digital version of the document from which the physical version was created), etc. At 278, the scanned-in digital document is then validated based at least on the information items retrieved at 276 and the scanned-in image of the physical document.

Figure 7:
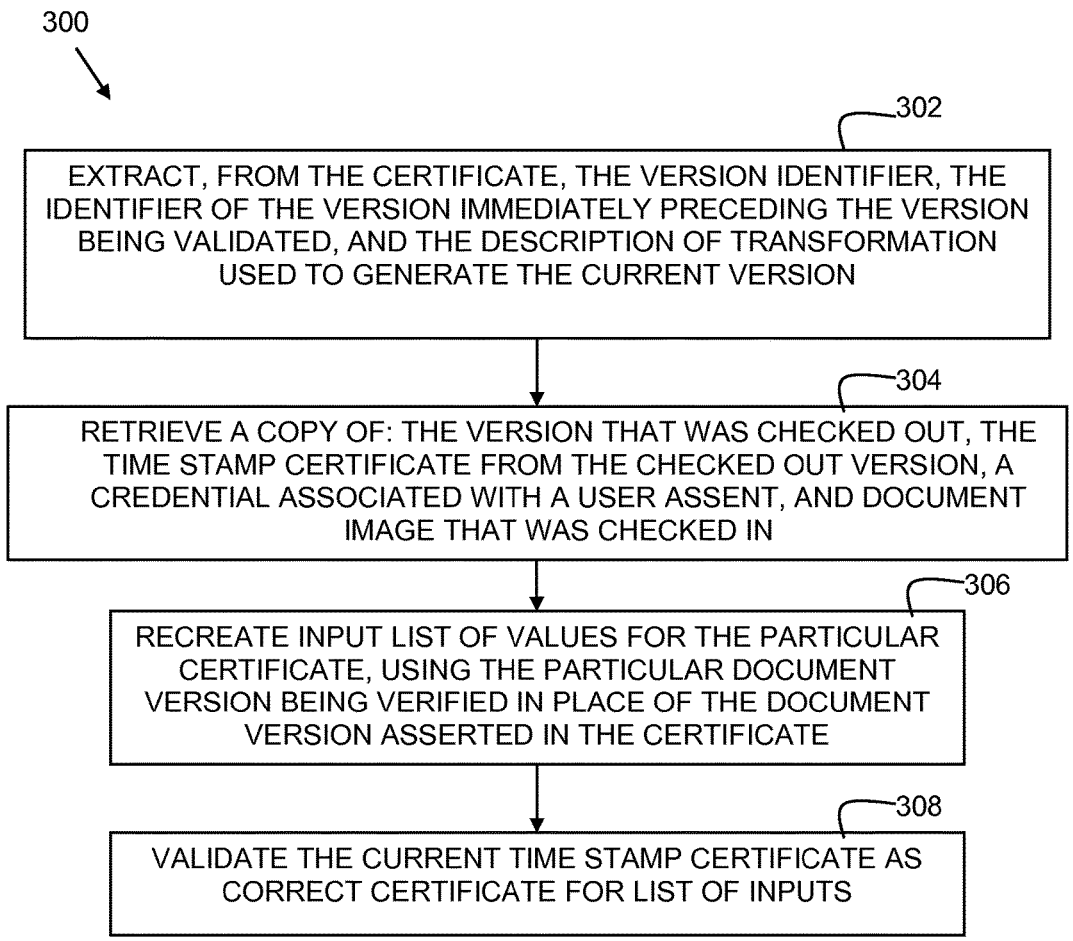
FIG. 7 illustrates a validation method in accordance with other examples.

FIG. 7 illustrates another example of a validation method 300. In some implementations, given a particular certificate for a particular document version to be verified, the validation process includes extracting, from the certificate, the version identifier of the version being validated, the identifier of the version immediately preceding the version being validated, and the transformation used to generate the current version (302). Further, the validation process may include (at 304) retrieving a copy of: the document version that was checked out (and for which the current version has been checked back in), the time stamp certificate from that checked out document version, a credential associated with the user assent to the check-in process, and the document image that was checked in. The validation process then recreates (306) the input list of values for the particular certificate using the particular document version being verified in place of the document version asserted in the certificate, and validates (308) the current time stamp certificate as correct certificate for this list of inputs.

The above discussion is meant to be illustrative of various principles and examples. Numerous variations and modifications are possible. It is intended that the following claims be interpreted to embrace all such variations and modifications.

What is claimed is:

1. A method comprising:
converting a physical version of a document to a digital representation of the physical version; and
computing, by a system comprising a hardware processor, a new certificate for the digital representation of the physical version based on combining at least the digital representation of the physical version, a prior digital representation of the physical version, a representation of an invocation of at least one operation performed to transform a different version of the document to the digital representation, and a prior certificate computed for the prior digital representation of the physical version.

2. The method of claim 1, wherein the at least one operation comprises any one or more of: image cleaning, optical character recognition (OCR) processing, and comparison of the digital representation to another digital representation of the physical version.

3. The method of claim 1, wherein the different version of the document comprises the physical version, and the representation of the invocation of the at least one operation comprises a representation of invocation of a scanning operation.

4. The method of claim 1, wherein the different version of the document comprises the prior digital representation and the representation of the invocation of the at least one operation comprises a representation of invocation of a transformation that transforms the prior digital representation to the digital representation.

5. The method of claim 1, wherein computing the new certificate comprises:
forming a value by the combining of at least the digital representation of the physical version, the prior digital representation of the physical version, the representation of the invocation of the at least one operation, and the prior certificate; and
computing a hash value using a hash function applied on the value.

6. A method of validating a document, comprising:
obtaining a version identifier from a digitized version of a physical document;
retrieving information items used previously to compute a time stamp certificate for the digitized version of the physical document, the retrieved information items including a representation of an invocation of at least one operation performed to transform a different version of the physical document to the digitized version, and a prior certificate computed for a prior digitized version of the physical document; and validating the digitized version of the physical document based at least on the retrieved information items and a scanned-in image of the physical document.

7. A non-transitory storage medium storing machine-readable instructions that when executed cause a system comprising a hardware processor to:
receive a digital representation of a physical version of a document; and
compute a new certificate for the digital representation of the physical version based on the digital representation of the physical version, a representation of an invocation of at least one operation performed to transform a different version of the document to the digital representation, and a prior certificate computed for a prior digital representation indicative of the physical version, wherein computing the new certificate comprises:
forming a value by combining at least the digital representation of the physical version, the representation of the invocation of the at least one operation, and the prior certificate; and
computing a hash value using a hash function applied on the value.

8. The non-transitory storage medium of claim 7, wherein computing the new certificate is further based on a hash of the prior digital representation.

9. The non-transitory storage medium of claim 7, wherein computing the new certificate is based on an identifier of the at least one operation.

10. The non-transitory storage medium of claim 7, wherein the instructions when executed cause the system to add an optical representation of a version identifier when printing the physical version.

11. The non-transitory storage medium of claim 10, wherein computing the new certificate is further based on the version identifier included on the physical version.

12. The non-transitory storage medium of claim 10, wherein the instructions when executed cause the system to identify the version identifier in the digital representation of the physical version.

13. The non-transitory storage medium of claim 12, wherein the version identifier is indicative of a document name.

14. The non-transitory storage medium of claim 7, wherein the instructions when executed cause the system to receive user input to confirm inclusion of the digital representation of the physical version in a document.

15. The non-transitory storage medium of claim 7, wherein the instructions when executed cause the system to associate the digital representation of the physical version in a document comprising the prior digital representation indicative of the physical version.

16. The non-transitory storage medium of claim 7, wherein the different version of the document comprises the physical version, and the representation of the invocation of the at least one operation comprises a representation of invocation of a scanning operation.

17. The non-transitory storage medium of claim 7, wherein the different version of the document comprises the prior digital representation, and the representation of the invocation of the at least one operation comprises a representation of invocation of a transformation that transforms the prior digital representation to the digital representation.

18. The non-transitory storage medium of claim 7, wherein the combining of at least the digital representation of the physical version, the representation of the invocation of the at least one operation, and the prior certificate comprises concatenating at least the digital representation of the physical version, the representation of the invocation of the at least one operation, and the prior certificate.

19. The non-transitory storage medium of claim 7, wherein the computing of the new certificate is further based on a time of the at least one operation.

20. The non-transitory storage medium of claim 19, wherein the new certificate is a time stamp certificate.

* * * * *